United States Patent [19]

Pagella et al.

[11] E Re. 29,531

[45] Reissued Feb. 7, 1978

[54] GRINDING MACHINE

[75] Inventors: Elio Pagella; Carlo Guerci, both of Ivrea, Italy

[73] Assignee: Ing. C. Olivetti & C., S.p.A., Ivrea (Turin), Italy

[21] Appl. No.: 756,691

[22] Filed: Jan. 4, 1977

Related U.S. Patent Documents

Reissue of:

[64] Patent No.: 3,932,961
Issued: Jan. 20, 1976
Appl. No.: 417,904
Filed: Nov. 21, 1973

U.S. Applications:

[62] Division of Ser. No. 194,325, Nov. 1, 1971, Pat. No. 3,818,643.

[30] Foreign Application Priority Data

Oct. 30, 1970 Italy ..... 70613/70
Oct. 30, 1970 Italy ..... 70614/70

[51] Int. Cl.[2] ..... B24B 49/18
[52] U.S. Cl. ..... 51/165.8; 51/165.87
[58] Field of Search ..... 51/232, 165.8, 165.87

[56] References Cited

U.S. PATENT DOCUMENTS

| | | | |
|---|---|---|---|
| 2,395,910 | 3/1946 | Schmidt | 51/232 X |
| 2,661,580 | 12/1953 | Crompton | 51/232 X |
| 2,873,560 | 2/1959 | Bertscher | 51/165.8 |
| 3,627,490 | 12/1971 | Asano | 51/165.87 |

FOREIGN PATENT DOCUMENTS

| | | | |
|---|---|---|---|
| 59,378 | 1942 | Denmark | 51/232 |

*Primary Examiner*—Harold D. Whitehead
*Attorney, Agent, or Firm*—Schuyler, Birch, Swindler, McKie & Beckett

[57] ABSTRACT

A grinding machine having a movable workhead for carrying a workpiece and a movable wheelhead for carrying a grinding wheel, the workhead and the wheelhead being axially movable along intersecting paths. The wheelhead is provided with a lead screw drive in which the screw is fixed against rotation and the nut carried by the wheelhead platform is rotated by a gear drive but is fixed axially. This drive is used to provide micrometric movement. The screw terminates at one end in a piston in a hydraulic cylinder, this providing piston/cylinder drive for large amounts of wheelhead movement. Workhead feed is provided by a rotatable and axially displaceable spindle drive by a step-by-step electric motor through a gear train that converts the rotary motion output of the electric motion to corresponding axial movement of the spindle.

7 Claims, 9 Drawing Figures

GRINDING MACHINE

Matter enclosed in heavy brackets [ ] appears in the original patent but forms no part of this reissue specification; matter printed in italics indicates the additions made by reissue.

*Related Application: This is a division of application Ser. No. 194,325 filed November 1, 1971, now U.S. Pat. No. 3,818,643.*

BACKGROUND OF THE INVENTION

This invention relates to a workhead for grinding machines having a spindle that is rotatable and is displaceable axially in an automatic manner in order to carry a workpiece toward and away from a grinding wheel.

Commonly, the workpiece to be ground is supported and caused to rotate, during the machining operation, by a workhead, while the grinding wheel, also revolving, is advanced towards the workpiece.

The workhead comprises a frame which is slidable on the machine table and can be fixed in any desired position thereon, and a spindle which is rotatably mounted on bearings on the frame, and caused to rotate by an electric motor connected by means of a belt drive. The spindle is provided with locking means for the workpiece, normally pincers, by means of which the workpiece is centered on the spindle and fastened thereto.

The aforementioned workpiece spindle is also movable axially on the frame in order to permit the axial displacement of the workpiece towards the grinding wheel; during which displacement particular machining operations can be accomplished, such as the grinding of a shoulder interposed between two cylindrical portions of the workpiece. The axial movement of the spindle is normally accomplished by means of hand-operated devices having graduated indicators provided with suitable points, by means of which the micrometric displacements are measured.

The workheads of the kind described above also have a number of drawbacks. First of all, the displacements of the spindle correspond only approximately to the theoretical displacements desired, owing to the lack of accuracy of the indicators and therefore, during machining, direct controls or measuring devices such as micrometrics on the workpiece are normally required. Further, workheads where the axial movement of the spindle is actuated manually, requiring a direct intervention by the operator, do not lead themselves to use with automatic machines having numerical control units, by means of which predetermined working cycles are accomplished in an automatic manner.

SUMMARY OF THE INVENTION

It is an object of the present invention to provide a workhead for a grinding machine which eleminates the drawbacks enumerated above.

The workhead in accordance with this invention is provided with a feed device comprising a rotatable work spindle displaceable axially and characterized in that the axial displacement of the work spindle is actuated by a step-by-step electric motor through means converting the rotational movement of the motor into axial movement of the spindle.

BRIEF DESCRIPTION OF THE DRAWINGS

For a better understanding of the present invention, two particular embodiments thereof will now be described, merely by way of non-limiting example, with reference to the accompanying drawings, wherein.

DESCRIPTION OF THE PREFERRED EMBODIMENTS

Figure 1:
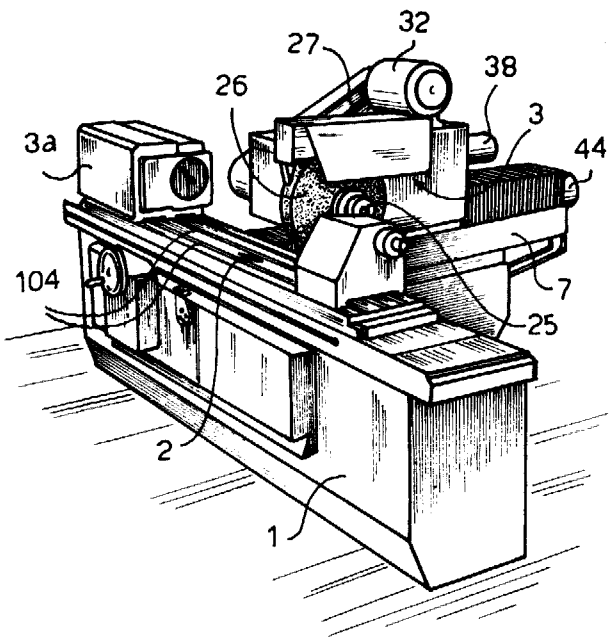
FIG. 1 shows a perspective view of the grinding machine in accordance with the present invention.

The grinding machine of the invention shown in FIG. 1 substantially comprises a bed 1 on which a table 2 is movable longitudinally, a wheelhead generally shown at 3, which is movable transversely, i.e. in a direction perpendicular to that of the table 2, and a workhead 3a.

Figure 2:
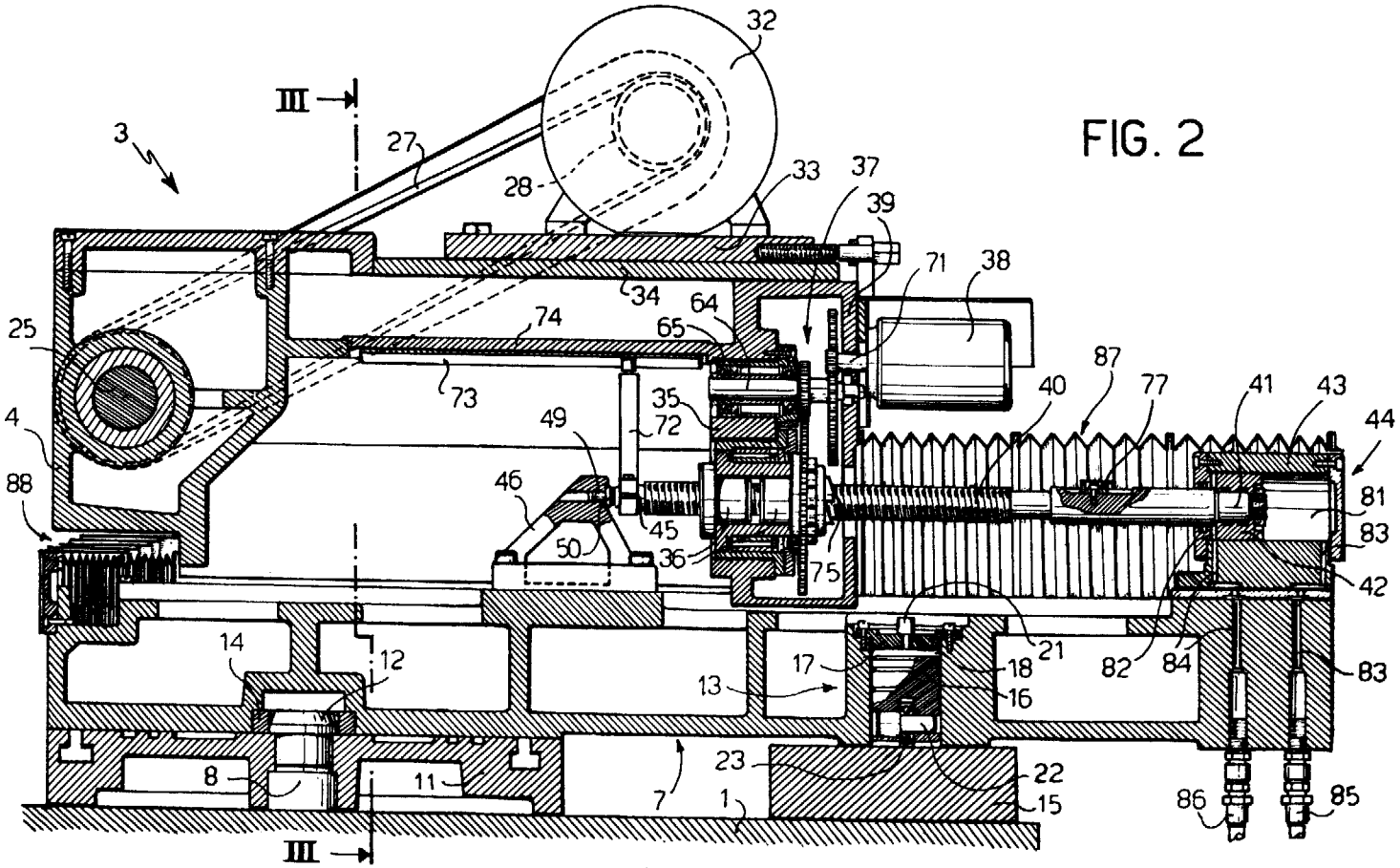
FIG. 2 shows a vertical section of the wheelhead of the grinding machine of FIG. 1.

The wheelhead 3 (FIGS. 2 and 3) comprises a frame 4 slidable on a pair of guides 5 and 6 (FIG. 3) on a rotary platform 7 on the bed 1 of the machine, substantially about the vertical axis of a pin 8 (FIG. 2).

The platform 7 (FIG. 2) is supported in front by a plate 11 integral with the machine bed 1 and to which the pin 8 is fastened. Platform head 12 is rotatably mounted upon a bushing 14 engaging of pin 8. The rear portion of platform 7 is supported on a second plate 15, also integral with the machine bed 1. Inside the platform 7 and above the plate 15 a rotation device 13 is provided for the purpose of facilitating the rotation of platform 7 about pin 8. Rotation device 13 comprises a plunger 16 having a vertical axis, plunger 16 in a chamber 18 of the platform, chamber 18 being defined by plunger 16 and a cover 17. Pressure fluid can be fed into chamber 18 through a duct 21. In the lower part of plunger 16 there is mounted, by means of a pin 22, a ball bearing 23 whose outer race is arranged to rest upon the upper surface of the plate 15.

Guide 5 and 6 (FIG. 3) are provided in the platform 7. Guide 6 is flat and guide 5 is substantially V-shaped. A number of rollers 24 are disposed in guides 5 and 6 to support frame 4.

Figure 3:
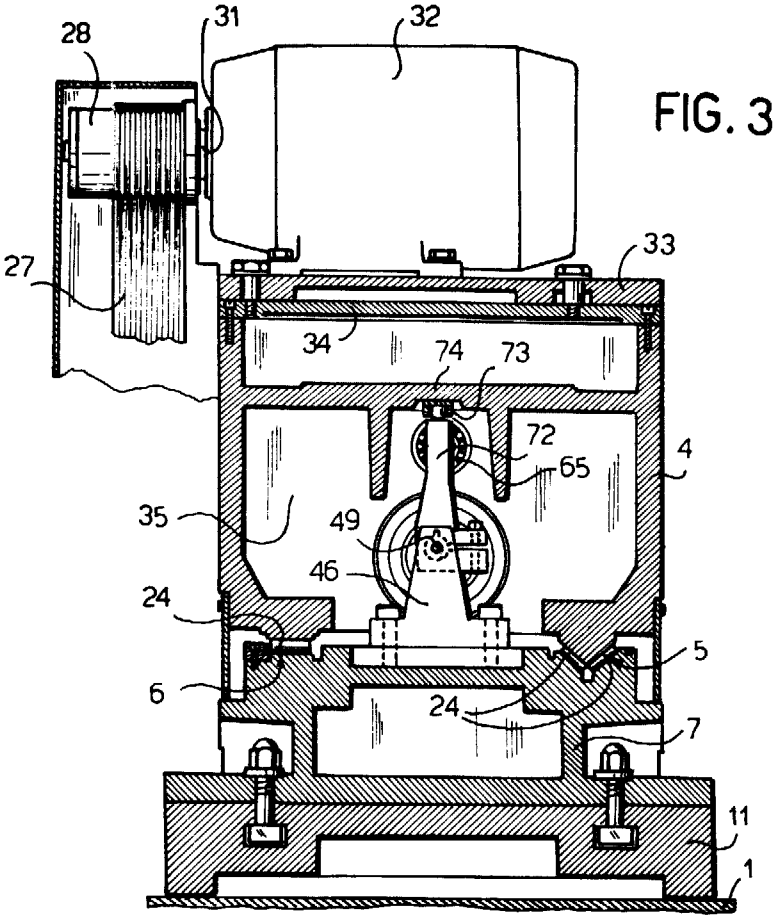
FIG. 3 shows a section of the wheelhead of FIG. 2 taken along the lines III—III of FIG. 2.

Wheel spindle 25 is mounted in the front part of the frame 4 (FIGS. 2 and 1) and is rotatable relative to frame 4 on bearings, not shown. To one end of spindle 25 a grinding wheel 26 (FIG. 1) is fastened. At the opposite end of spindle 25 a pulley (not shown) is secured. The pulley is rotated by means of a drive belt 27 (FIGS. 1 and 2) engaging a pulley 28 (FIG. 3) integral with the output shaft 31 of an electric motor 32 mounted on a support plate 33 (FIGS. 3 and 2). Support plate 33 is mounted on wall 34 of frame.

In the rear part of the frame 4 (FIG. 2) a substantially vertical wall 35 is provided, on which two screw nuts 36 are mounted. Nuts 36 are rotatable with respect to wall 35, but are axially stationary with respect thereto. Nuts 36 are rotated through a drive shown generally at 37, having a step-by-step electric motor 38 fastened to a rear wall 39 of the frame 4. The nuts 36 are engaged by a screw 40, one of whose ends 41 is integral with a piston 42 adapted to slide inside a casing 43 of a hydraulic cylinder shown generally at 44. The other end 45 of screw 40 is arranged to cooperate, when the piston 42 is in the position of the end of its forward stroke (to the left in FIG. 1), with a stop 46 fastened to the upper surface of the platform by means such as screws. Stop 46 preferably comprises a pin 49 provided with a head 50 upon which the end 45 of the screw 40 can rest.

Each nut 36 (FIG. 4) has inside a helical path 47 cooperates with threads 48 of screw 40 to define a helical channel inside which a number of balls 51 are mounted. Thus the nuts 36 and screw 40 engage with one another by means of the balls 51. This type of nut 36 is a ball recirculating type. Instead of using a lead screw and nut assembly comprising two nuts 36 and a screw 40 of the kind described, it is possible to use any other screw and nut assembly of conventional kind.

Each nut 36 is provided with a flange 52 by means of which it is fastened, by means of screws for example, to a sleeve 53 which is rotatably mounted on a bushing 54 by means of a needle bearing 55 and a double-acting thrust bearing 56. The assembly of the sleeve 53, with respect to the bushing 54, is effected with the procedures normally followed for assembling a revolving member to which both radial loads and axial loads directed in opposite directions are applied. In the case of the embodiment illustrated in FIG. 4, the intermediate race of the thrust bearing 56 is held axially stationary relative to the bushing 54, together with the outer race of the bearing 55, by means of a locking ring 58. Thrust bearing 56 is supported, on one side by the inner race of the bearing 55 and, on the other side by a hub 59 of a gear 60 secured to the sleeve 53 by means of a ferrule 61 screwed on a threaded section of sleeve 53.

Gear 60, which is torsionally integral with sleeve 53 by means of a tab 62, is in mesh with another gear 63 fastened to a shaft 34 which is rotatably mounted, by means of a pair of ball bearings 65, on a bushing 66. Preferably, the bushings 66 and 54 are both secured to wall 35 of the frame 4 by means of rings 67 which are fastened, in turn, to wall 35 by means of screws and an urged against flanged parts 66 of bushings 66 and 54, respectively.

Shaft 64 is further integral with a gear 69 which meshes with a pinion 70 fastened to the output shaft 71 of the step-by-step motor 38.

In order to prevent that rotation of screw 40 when nuts 36 are rotated, an arm 72 (FIGS. 2 and 3), is fastened at one end to the end 45 of the screw 40, and at the other to the inside of a straight guide 73 secured to a wall 74 of the frame 4. Other means for preventing rotation of screw 40 can be provided, such as a pin integral with the casing 43 (FIG. 2) of the hydraulic cylinder 44 and cooperating with a corresponding groove of the end portion 41 of the screw 40.

Figure 4:
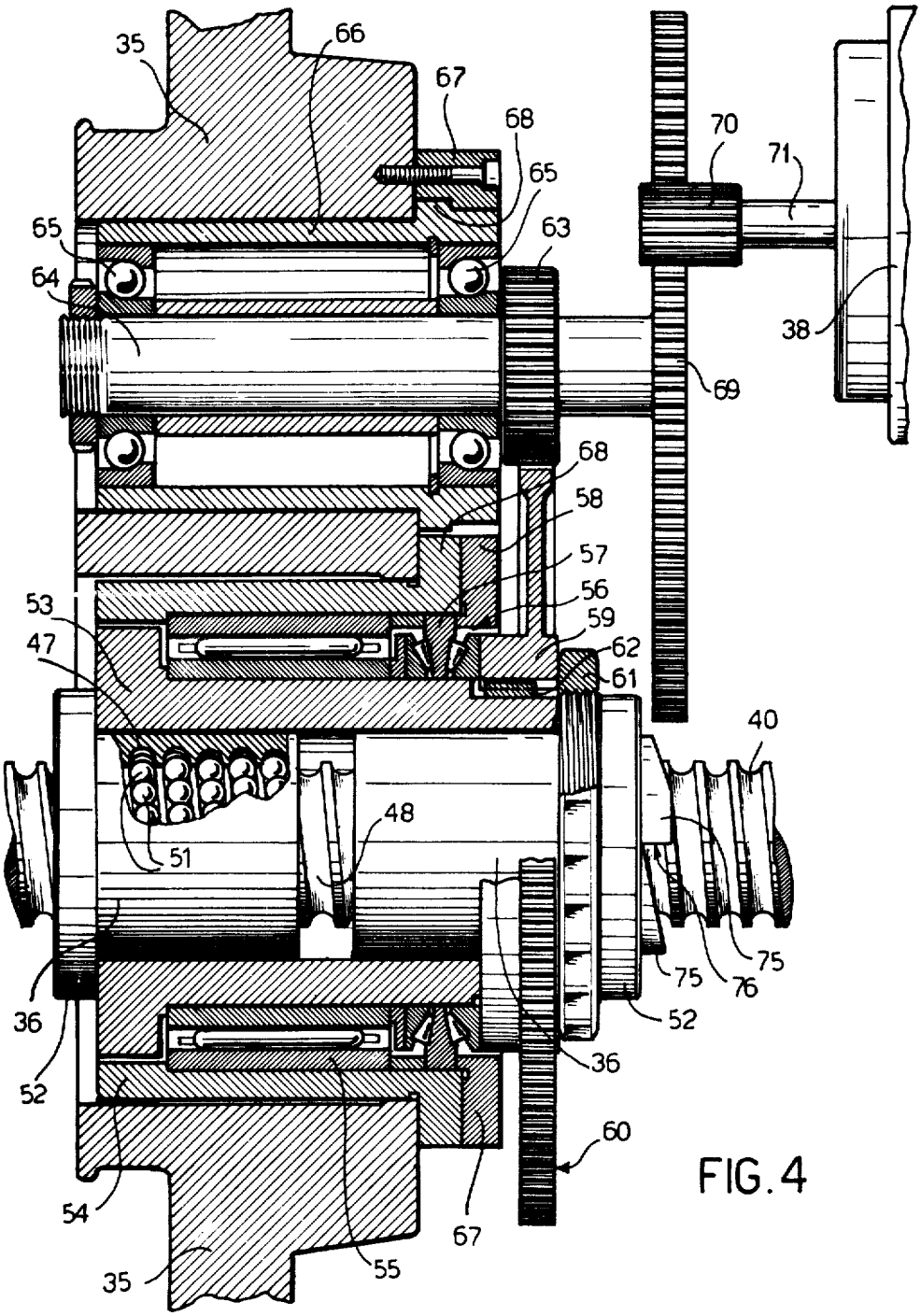
FIG. 4 shows a partial section, on enlarged scale, of the wheelhead illustrated in FIG. 2.

On the flange 52 (FIG. 4) of the nut 36 shown at the right hand side of FIG. 4, a number of axial teeth 75 are provided, each tooth having a substantially trapezoidal shape and a flat surface 76 parallel to the axis of the screw 40. A tab 77 (FIG. 2) is fastened to the end section 41 of screw 40 to cooperate, in a manner to be described below, with flat surface 76 (FIG. 4) of one of the teeth 75.

Inside casing 43 of the hydraulic cylinder 44 there are two chambers 81 and 82, into which a pressure fluid can be fed through the ducts 83 and 84, respectively. Ducts 83 and 84 are connected with suitable feed pipes 85 and 86.

A bellows 87, secured to the rear of the frame 4 and to the casing 43 of the cylinder 44, protects the screw 40 and the guides 5 and 6 (FIG. 3) of the platform 7, and a set of slidable plates 88 (FIG. 2) disposed in the front part of the said platform also protect guides 5 and 6.

Figure 5:
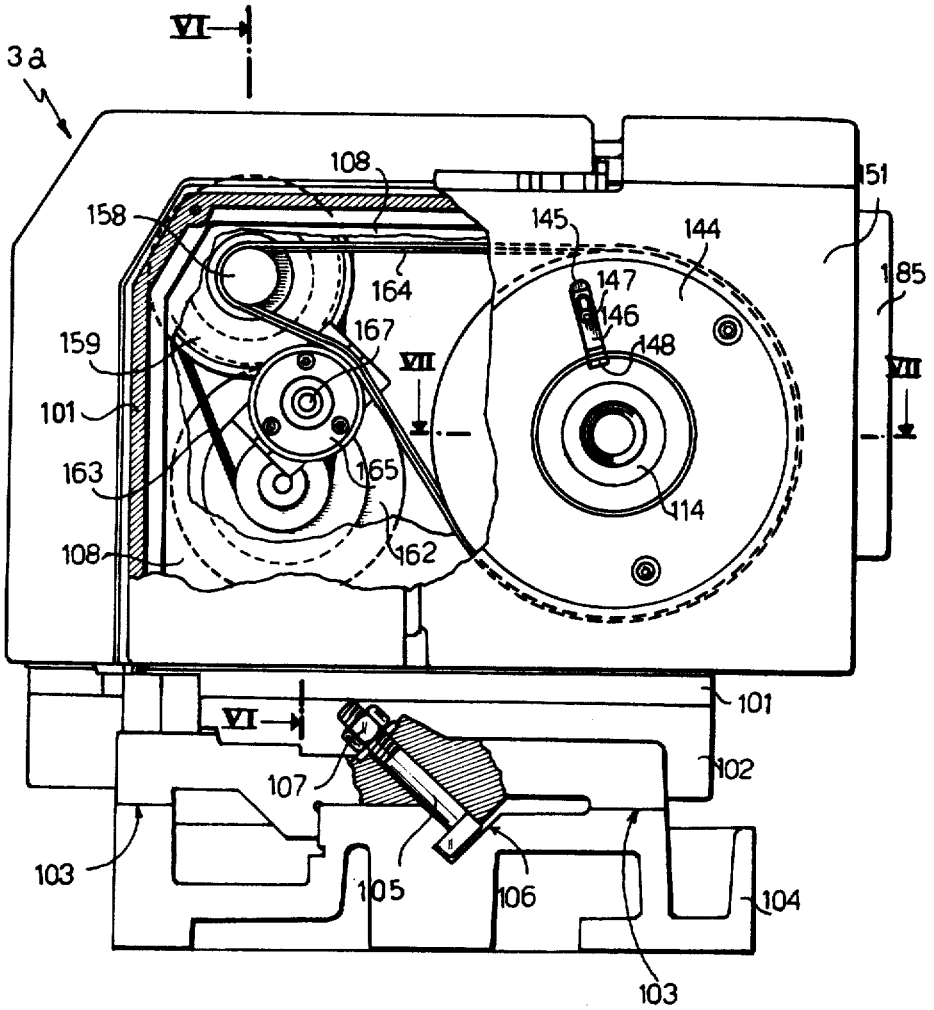
FIG. 5 shows a front view, partly in section and partially broken away, of a first embodiment of the workhead of the grinding machine according to the invention.

Workhead 3a comprises a frame (FIGS. 5 and 7) rotatable about a vertical axis on a platform 102 (FIG. 5). Platform 102 has a pair of guides 103 that cooperate with corresponding guides of the table 104 of the machine during the longitudinal displacement of the platform 102 on said tables. Platform 102 can be fastened in any desired position on table 104 by locking means comprising (FIG. 6) a screw 105 whose head is adapted to slide in a groove 106 of the table 102 and whose stem is received in a hole of the platform 102 and the corresponding nut 107.

Frame 101 (FIG. 6) comprises a pair of vertical walls 108 and 109 at right angles to one another and a bottom wall 110 perpendicular to walls 108 and 109. Wall 109 is attached by a pair of flanges 111 to a plate 112 which carries an electric motor 113 adapted to control the rotation of the spindle 114 (FIGS. 5 and 7) of the workhead.

Figure 6:
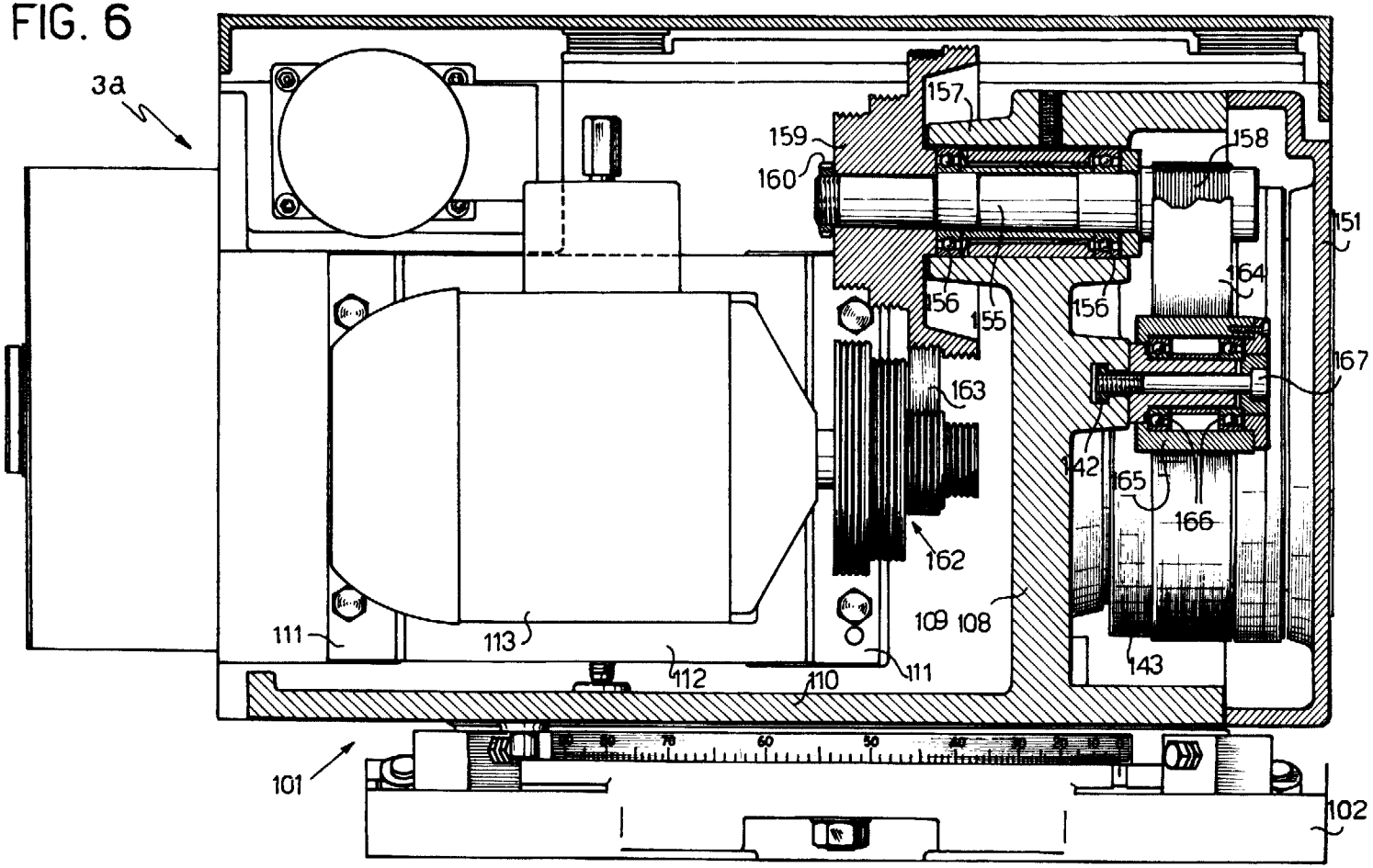
FIG. 6 shows a vertical section of the workhead of FIG. 5, taken along the lines VI—VI.

Spindle 114 (FIG. 7) is mounted for rotation on a pair of bearings 115 and 116 of the hydrodynamic sustentation type, each of which is housed in a corresponding sleeve, 117 and 118 respectively. Sleeve 117 is integrally formed with wall 108 (FIGS. 6 and 7), and sleeve 118 is integrally formed with a rear wall (FIG. 4) also forming part of the frame 101 (FIGS. 5 and 6).

Figure 7:
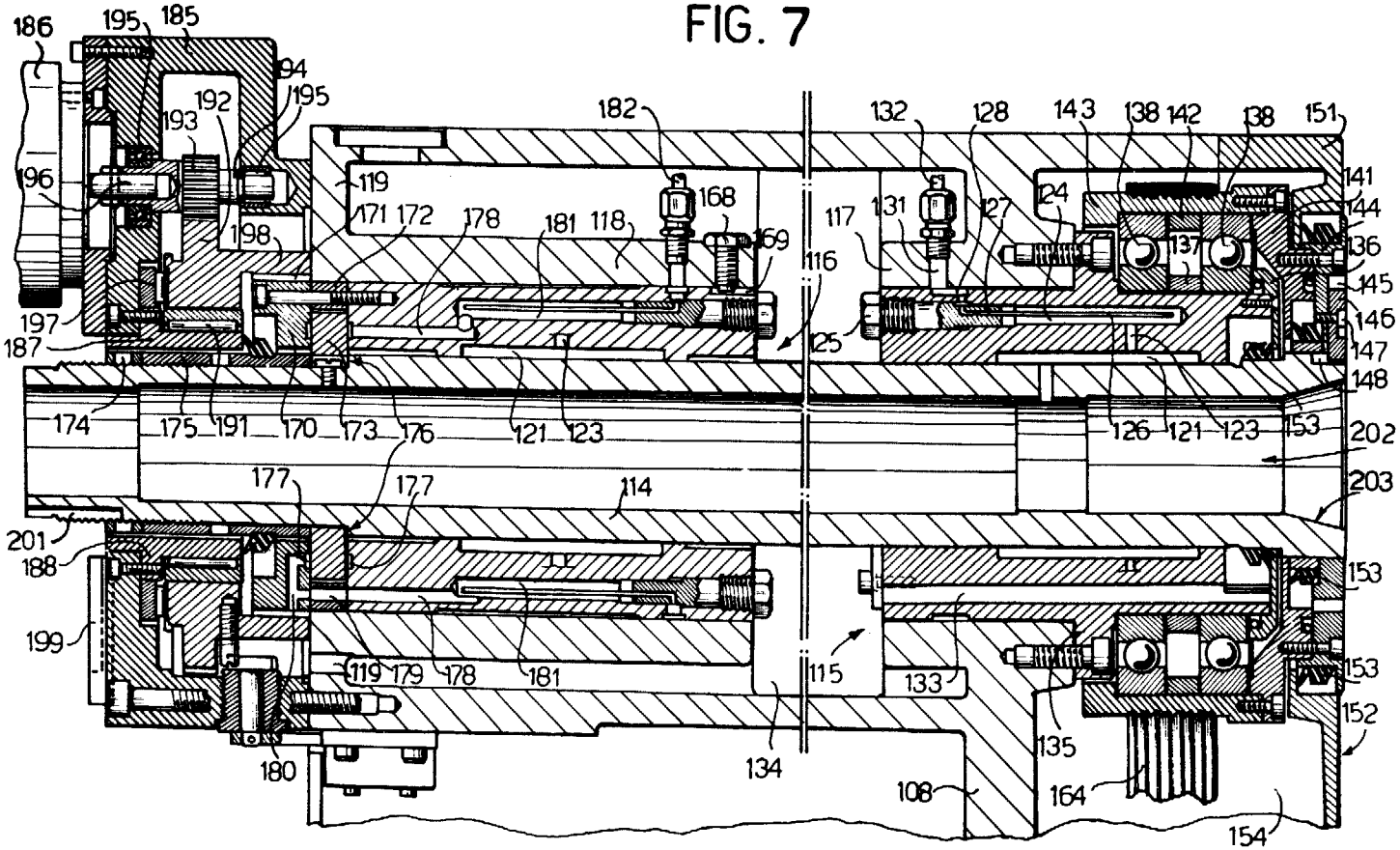
FIG. 7 shows a longitudinal section, partial and on enlarged scale, of a workhead illustrated in FIG. 5, taken along the lines VII—VII.

Each bearing 115 and 116 comprises a recess 121 (FIG. 7) of such a shape as to generate, hydrodynamic forces to support said spindle when spindle 114 is revolving and the recesses 121 are filled with oil. Each recess 121 is in communication through a radial hole 123 in the bearing with a corresponding axial blind hole 124, which is closed by means of a threaded plug 125. In FIG. 7 only the hole 124 and the plug 125 of the front bearing 115 are shown, inasmuch as the corresponding elements of the rear bearing 116 lie in a plane different from the section plane of FIG. 7. Each hole 124 is in communication, through a thin gauged tube 126 fastened in a hole 127 of the plug 127, with an annular channel 128. A radial opening 131 provided in the sleeve 117 connects channel 128 with a feed pipe 132, through which the pressure fluid is fed to the recesses 121.

In the lower part of each bearing 115 and 116 an axial hole 133 is provided to allow the return of the pressure fluid flowing out of the recesses 121 to the front portion of the spindle 114 (at the right hand side of FIG. 3) and to convey the pressure fluid to the inside of recess 134 of the frame 101.

Bearing 115 has a flange 135 fastening by means of screws, to sleeve 117 of the front wall 108 (FIGS. 6 and 7) of the frame 101. The inner races of two ball bearings 138 are fastened, by means of a locking ring 136 and a spacer 137 to a cylindrical front section of the bearing 115 (FIG. 4). The outer races of bearings 138 are secured by means of a ring-shaped member 141 and a spacer 142, in a hole of a pulley 143 adapted to rotate about the cylindrical section of the bearing 115.

A disk 144 (FIGS. 5 and 7) is fastened to member 141. Disk 144 has a radial recess 145, inside which a corresponding thin plate 146 is adapted to slide. Plate 146 can be locked in a predetermined position relative to disk 144, by means of a screw 147. The end of plate 146, this is adjacent to spindle 114, is adapted to be inserted inside a corresponding cavity or recess 148 (FIG. 7) provided in the outer peripheral portion of spindle 114.

In a front cover 151 of the workhead 32 there is provided a hole, inside which the annular member 141 and the disk 144 are housed. The front surface 152 of cover 151 defines is in substantially the same plane as the front faces of disk 144 and the spindle 114. Suitable ring-shaped seals 153, normally of rubber can be used to establish a seal between the outside and a cavity 154 defined by cover 151 and wall 108.

A shaft 155 (FIG. 6) is mounted idle, by means of ball bearings 156, on a sleeve 157 formed integrally with front wall 108 of the frame. On one end of shaft 155 is a pulley 158 (FIGS. 6 and 5). On the other end of shaft 155 is a cone of pulleys 159 (FIG. 6) secured by means of a ring nut 160. Another cone of pulleys 162 is mounted on the output shaft of electric motor 113. Corresponding pulleys of cones 159 and 162 are connected by means of a drive belt 163 (FIGS. 5 and 6). Another drive belt 164 connects pulley 158 and pulley 143, so as to transmit the drive from the electric motor 113 to the spindle 114 with a suitable velocity ratio, dependent upon the selection of cones of pulleys 161 and 162. An appropriate belt stretcher 166 can be mounted, by means of a pin 167, on the wall 108 of the frame along the path of the belt 164.

Bearing 116 (FIG. 7) is slidable axially inside the corresponding sleeve 118 and, in order to prevent rotation, a screw 168 is carried by sleeve 118 and extends inwardly to engage a cavity 169 in bearing 116. A ring 170, provided with an outer thread 171 is fastened, by means of screws and with a spacer 172 interposed inbetween, to bearing 116. Between ring 170 and bearing 116 another ring 173 is disposed. Ring 173 is locked — both axially and torsionally — with respect to spindle 114 by means of a ring nut 174 screwed on a corresponding threaded section of spindle 114 and adapted to urge, through a spacer 175, ring 173 against a shoulder 176 of said spindle.

The thickness of spacer 172 is slightly greater than that of ring 173, so as to allow ring 173 to rotate inside the ring-shaped recess defined by the surfaces of spacer 172 ring 173, and bearing 116. Annular cavities 177 are provided in there surfaces of rings 173 and bearing 116 and are in communication, through channels 178, 179 and 180, provided respectively in the bearing 116, the spacer 172 and the ring 170, with other axial holes 181 provided in bearing 116 and quite similar to holes 124 already described with reference to bearing 115. Holes 118 are further connected in a manner quite identical to that already described with reference to holes 124, with appropriate feed pipes 182, through which pressure fluid is fed to annular cavities 177.

To the front wall 119, also forming part of the frame 101, a box 185 is fastened to front wall 119, and a step-by-step motor 186 is mounted thereon. Box 185 is attached to a support member 187 of tubular shape, provided with a flanged portion 188 which is secured to box 185 by means of screws. Flanged portion 188 forms a seat for a roller bearing 191. The outer race bearing 191 is housed in an opening in a gear 192 which meshes with another gear 193. Gear 193 has a shaft 194 supported, by means of ball bearings 195, on the walls of box 185 and is also connected to output shaft 196 of motor 186. Gear 192 is supported, on one side, by the rear wall 119 of box 185 and, on the other side, by the rollers of a thrust bearing 197, whose seat is formed in the box 185.

Gear 192 is further provided with an annular portion 198, on whose inner surface a thread is formed, which cooperates with the thread of ring 170.

On the rear wall of box 185 is a radially slidable thin plate 185, the end of which can be inserted in an axial cavity 201 provided in the rear portion of spindle 114.

Inside spindle 114 is a opening 202 having a tapered section 203. A clamp of conventional construction is mounted in opening 202, to be actuated by acting upon its rear portion in order to lock a workpiece on spindle 114.

Figure 8:
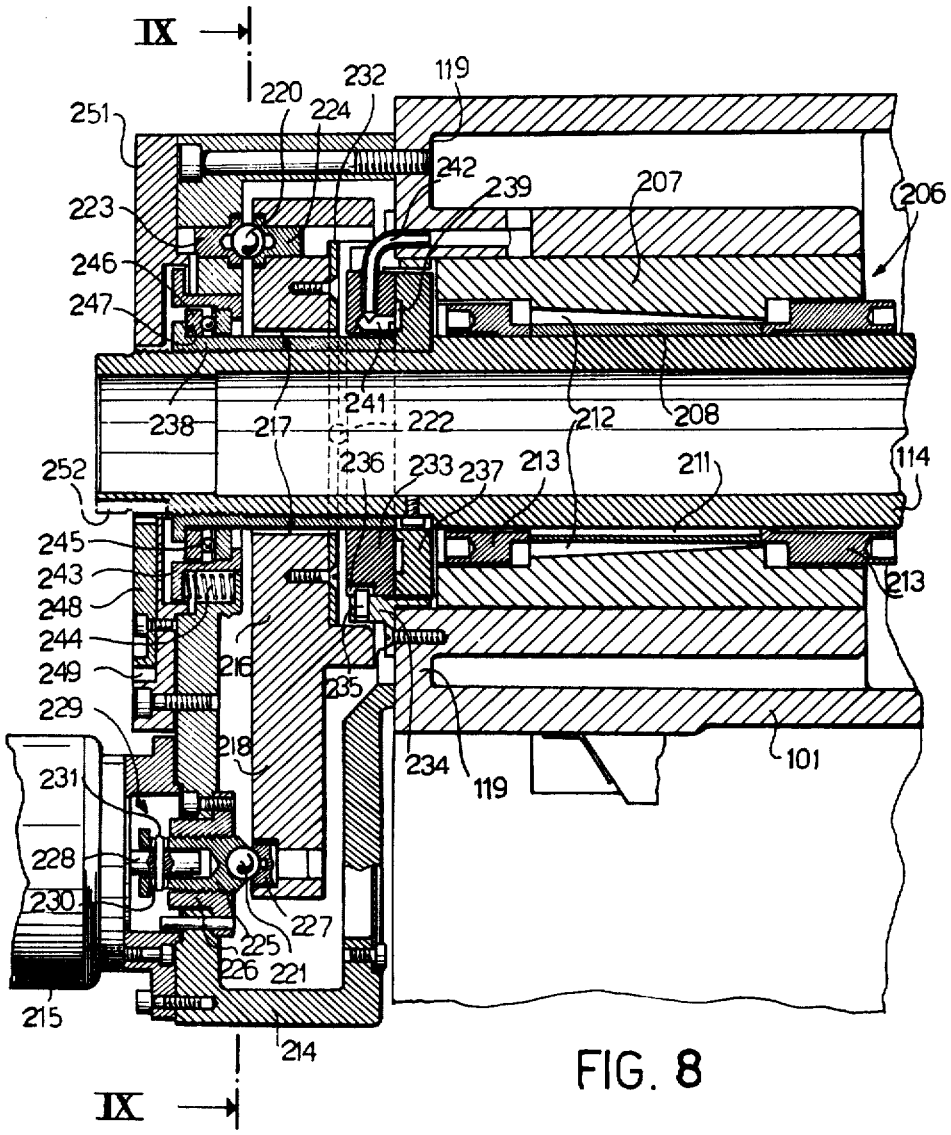
FIG. 8 shows a partial longitudinal section of a second embodiment of the workhead of said grinding machine.
Figure 9:
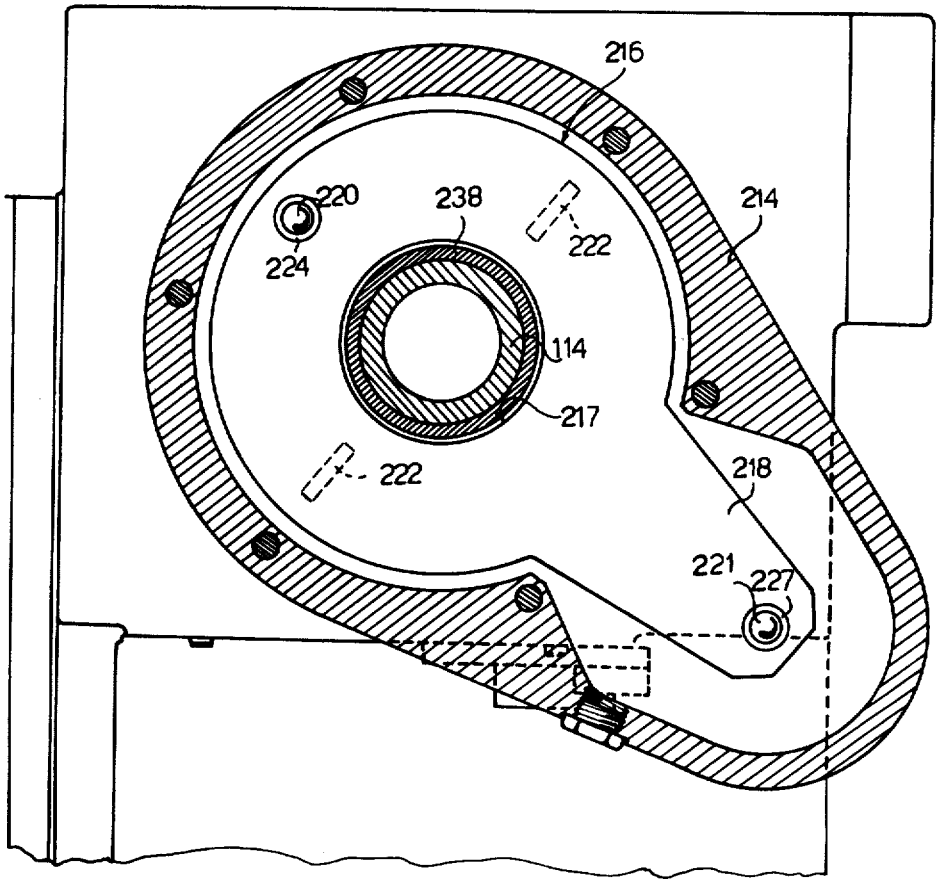
FIG. 9 shows a section of the workhead of FIG. 8 taken along the lines IX—IX.

In FIGS. 8 and 9 there is partially illustrated a second embodiment of the workhead of the invention.

The spindle 114 (FIG. 8) of the second embodiment is supported on the frame 101, by means of sliding bearings shown generally at 206, instead of by hydrodynamic bearings of the 115 and 116, as described above. Only the left hand bearings 206 can be seen in FIG. 8. Each bearing 206 comprises a bushing 207 having a tapered opening inside which a ring 208 is mounted. Each ring 208 is provided with cavities 211 for lubrication. Outer grooves 212 are provided for the purpose of imparting to ring 208 a resilience or elasticity sufficient to allow compensation for any radial backlash by an axial displacement of ring 208 in the bushing 207, caused by the tightening of a pair of ring nuts 213 threadably engaged in corresponding end threaded holes of bushing 207.

Rear wall 119 of frame 101 is attached to a box 214, to which a step-by-step motor 215 is secured. Inside box 214 a lever 216 (FIGS. 8 and 9) is disposed, provided with a hole 217 coaxial with the spindle 114 and with an arm 218. The axis of arm 218 (FIG. 9) forms an angle of about 45° with the plane where the workhead 32 moves. Lever 216 is supported by a pair of balls 220 (FIGS. 8 and 9) and 221 disposed in the same plane and on opposite sides with respect to the axis of spindle 114, and by a pair of rollers 222 also disposed on opposite sides relative to spindle 114, in a plane orthogonal to the first-mentioned plane. The ball 220 (FIG. 8) is housed in tapered holes provided in two bushings 223, 224. Bushings 223 is fastened to the rear wall of the box 214, and bushing 224 is secured in a hole provided in the lever 216. The ball 221 is housed, on one side, in a spherical cavity of a cylindrical member 225 provided with a screw thread wich is screwed into a nut screw 226 fastened to the box 214, and, on the other side, in a tapered hole provided in a thin plate 227 secured to the arm 218 of the lever 216. Threaded member 225 is connected to the shaft 228 of the motor 215 by means of a coupling 229 which has the purpose of making member 225 integral torsionally with shaft 228, shile still leaving the member 225 axially free relative to shaft 228. Coupling 224 comprises an eyelet 230 provided in the threaded member 225, inside which is a pin 231 passing through shaft 228.

Rollers 222 are supported, on one side, by a seat provided in a thin plate 232 (FIG. 8) fastened to the lever 216 and, on the other side, by a ring 233 torsionally stationary relative to the frame 101 and axially slidable with respect thereto. Ring 233 is slidably movable within a hole of a support member 234 which is secured to the frame 101 by means of screws. A pin 235, attached to member 234, can enter a corresponding recess 236 of the ring 233 in order to prevent ring 233 from rotating relative to member 234, although allowing the relative axial displacement thereof. Ring 233 cooperates with another ring 237 secured to spindle 114 by means of a ring nut 238. In the face of ring 237 facing towards ring 233 there is an annular recess 239 which communites through a hole 241 with a duct 242 to which pressure fluid is fed from other ducts, not shown.

Inside a bushing 243, housed in a corresponding seat in the rear wall of the box 214 and normally urged towards the rear portion of the spindle 114 by helical springs 244 is a thrust bearing 245. Race 246 of bearing 245 coacts with a corresponding shoulder 247 of ring nut 238, so as to normally hold ring 237 and, therefore, the spindle 114 which is integral therewith, in contact with ring 233.

A thin plate 248, slidable radially in a corresponding groove 249 of a rear cover 251 of the box 214, is adapted to be inserted in an annular recess 252 provided in the rear part of the spindle 114.

OPERATION

The operation of the grinding machine described above is as follows: The operation of the wheelhead 3 shall be considered first. As a beginning point, screw 40 is in its forward stroke position, with respect to the platform 7, as shown in FIG. 2. Pressure fluid is fed to chamber 82 in cylinder 44 from feed pipe 86. Piston 42 will then be displaced towards the position of the end of its rearward stroke (i.e. to the right in FIG. 2) together with the screw 40. In this manner the rapid hydraulic backward displacement of the wheelhead 3 is accomplished, during which the frame 4, by sliding on the guides 5 and 6 (FIG. 3) of the platform 7, is displaced from the workpiece.

If, with the screw 40 (FIG. 4) in the aforementioned position, pressure fluid is fed through the feed pipe 85 and the duct 83 to the chamber 81 of said cylinder, then the screw 40 wll be displaced forward to the opposite end-of-stroke position. This stroke is limited by the end 45 abutting head 50 stop 46. Thus the forward displacement of said screw 40 can be precisely marked. The micrometric adjustment of frame 4 begins at this precisely defined position, controlled by the step-by-step motor 38. Micrometric movement is accomplished by sending a certain number of pulses to step-by-step motor 38, causing motor 38 to rotate output shaft 71 by a predetermined angle.

The pinion 73, which is integral with the shaft 71, will cause the gear 69 to rotate and gear 69, through the pair of gears 63 and 60, will in turn cause rotation of the sleeve 53 and nuts 36.

During rotation of nuts 36, balls 51 will be caused to circulate in the helical channel. Since the screw 40 is prevented from rotating on account of the coupling of the upper end of arm 72 with the guide 73 (FIGS. 2 and 3), an axial traverse of the frame 4 relative to said screw will take place, the direction depending on the direction of rotation of nuts 36. During this traverse movement, the upper end of arm 72 will slide inside guide 73.

Rapid displacement of screw 40, by hydraulic cylinder 44 (FIG. 2) can be accomplished whatever the relative position of the nuts 36 with respect to the screw 40 may be. Rotation of nuts 36 to actuate the micrometric movement of the frame 4, can also be accomplished whatever the relative position of the screw 40 with respect to the cylinder 44. Therefore, micrometric movement can be accomplished concurrently with the rapid hydraulic displacement of said screw, if desired.

When the relative axial displacement of the nuts 36 with respect to the screw 40 is such as to bring the flat surface 76 (FIG. 4) of one of the teeth 75 into engagement with one of the side faces of the tab 77 (FIG. 2), then the rotation of the nuts 36 and, therefore, the axial displacement of screw 40, will be arrested. Accordingly, the teeth 75, associated with the tab 77, constitute a device for arresting the rotation of the nuts 36.

When platform 7 is to be rotated about the axis of the pin 8, pressure is fed to the chamber 18 through the duct 21. The plunger 16 will then be displaced downwardly and, as a result, the platform 7 will be raised and the upper surface of this platform, which initially rested upon the plate 15, will clear plate 15. Contact between platform 7 and plate 15 will now take place solely through the bearing 23 and, therefore, the rotation of the platform 7 upon plate 15 can occur with a very low friction.

The operation of the workhead 3a of the grinding machine corresponding to the first embodiment described above is as follows:

The workpiece is mounted on a clamping device (not shown) in the hole 202 (FIG. 7) of spindle 114. The tapered front part of the clamping device is coupled with the conical section 203 of the hole 202 and, by operating suitable actuating means (not shown), the clamping device can be displaced axially relative to the spindle 114, thereby closing upon the workpiece inserted therein. Subsequently, by displacing radially the thin plate 146 towards the spindle 114, the end of plate 146 will be inserted inside recess 148 of spindle 114, so as to make the disk 144 torsionally integral with spindle 114. When plate 146 is inside recess 148, the plate 199 must be outside the corresponding cavity 201 in the spindle 114 in order to permit the rotation of the said spindle.

After choosing a predetermined speed of rotation for spindle 114, belt 163 (FIG. 6) is mounted on that pair of cooperating pulleys of the cones 161 and 162 that will provide the desired speed of rotation. Upon energization of the motor 113, belt 163 will also cause pulley 143 to rotate via pulley 158 and the belt 164 (FIGS. 6 and 7). Pulley 143 will rotate idle on the bearings 138 (FIG. 7) and being integral with the annular member 141 and the disk 144, will entrain member 141 and disk 144 in rotation. Disk 144 will then, through the coupling of the plate 146 with the recess 148, causing rotation of spindle 114. Belt straightener 115 will also rotate during the movement of the belt 164.

While the spindle 114 rotates, pressure fluid is fed to pipes 132 (FIG. 7) and 182, and passes through axial holes 124 of bearings 115 and 116 and axial holes 183 in bearing 116. From the holes 124 the oil will pass through the holes 123 in recesses 121 of said bearings, thereby lubricating and reducing the friction of spindle 114. The oil which can flow out through the radial clearance between the outer surface of said spindle 114 and the inner coupled surfaces of the bearings 115 and 116, will be collected below and is recycled, through the holes 133, inside the recess 134 in the frame 101. The small calibrated pipes 126, disposed inside the holes 124 and through which the oil will flow, serve to exactly adjust the pressure and the speed of the oil fed to the recesses 121.

The oil fed to recesses 181, through the holes 178, 179 and 180, is recirculated in the annular cavities 177 disposed in front of the surfaces of the ring 173. Therefore a layer of lubricant under pressure is formed to permit low friction rotation of the ring 173 relative to stationary ring 170 and the bearing 116, between said surfaces and the surfaces of the ring 170 and the bearing 116 coupled therewith.

In order to displace the workpiece axially relative to the grinding wheel spindle 114 must be displaced. This is accomplished by energizing motor 186 by sending thereto a predetermined number of pulses generated by a suitable electric circuit. Shaft 196 of motor 186 will thus rotate through an angle of predetermined value as will stem 194, and gears 192 and 193. Since the inner threaded hole of the tubular portion 198 of the gear 192 is coupled with screw threads 171 of ring 170, a predetermined rotation of gear 192 will cause a corresponding axial displacement of ring 170, since gear 192 cannot move axially because of being sandwiched between wall 119 and thrust ring 197.

Since ring 170 is attached to bearing 116, during axial movement of ring 170 bearing 116 will also be displaced, sliding inside the sleeve 118. Inasmuch as ring 173 is also integral axially with ring 170, during movement of ring 170 spindle 114 will also be displaced. Therefore, in response to a certain number of pulses to the motor spindle 114 will be displaced axially a predetermined distance.

Motor 186 can rotate in either direction and therefore the axial displacement of spindle 114 can be also in either direction, to move the workpiece towards or away from the grinding wheel. The maximum value of the displacement is rather low, for instance of the magnitude of 2mm, which is quite sufficient for the normal grinding operations.

The operation of the workhead 3a corresponding to the second embodiment just described and illustrated in FIGS. 8 and 9 is as follows:

Spindle 114 (FIG. 8) is caused to rotate in a manner similar to that described with reference to the first embodiment of the present invention. During this rotation, the outer surface of spindle 114 will slide upon the inner surfaces of the bearings 206. Bearings 206 as contrasted with those of the preceding embodiments, are stationary with respect to the frame 101. To correctly adjust the axial play or backlash between the spindle 114 and the ring 208, ring 208 will be displaced axially relative to bushing 207 by acting upon the ring nuts 213. If bearing 206 shown in FIG. 8 is displaced to the right with respect to corresponding bushing 207, because of the interference fit of the conical outer surface ring 208 with the inner surface, of complementary shape, of bushing 207, a radial elastic deformation of ring 208 will occur.

During rotation of spindle 114 a force is applied which tends to push the spindle 114 to the left in FIG. 8. This force is generated by springs 244 and is applied to spindle 114 via which bushing 243, thrust bearing 245, and shoulder 247 of ring nut 238. Therefore, ring 237 which is integral with spindle 114, will be pushed towards ring 233. Since ring 233 abuts, rollers 222 which in turn abut lever 216, the force generated by springs 244 will be unloaded to lever 216, and then passed to rear wall of box 214 through balls 221 and 222.

During the rotation of the spindle 114, a relative movement will occur between ring 237 rotating with spindle 114 and ring 233 which held stationary with respect to the frame 101 by pin 235 acting on recess 236. In order to reduce the friction during the sliding movement which occurs between the faces of rings 233 and 237, oil is fed under pressure to annular cavity 239 through duct 242 and hole 241. The layer of lubricant thus formed reduces considerably the friction between the engaging faces of rings 233 and 237 during the rotation of spindle 114.

In order to axially displace the spindle 114, a number of pulses is applied to the step-by-step motor 215 to cause the output shaft 228 of said motor to rotate through a predetermined angle. This shaft will, in turn, cause rotation, through the coupling 229, of threaded member 225. Since the nut 226 is secured to the box 214, a relative axial displacement of member 225 will thus occur with respect to nut 226 and shaft 228 of the motor 215, as allowed by the coupling 229. Therefore, ball 221 will also be displaced axially, thereby causing a pivotal movement of the lever 216 about an ideal hinge whose axis passes through the center of the ball 220 and is orthogonal to the plane of the drawing of FIG. 8.

During the aforementioned rotation of the lever 216, the rollers 222 are displaced in the direction of the axis of the spindle 114, but this displacement is less than that of the ball 221 in the same direction. In fact, the distance between ball 221 and the ideal hinge mentioned above is greater than the distance between rollers 222 and the same hinge. Therefore, the displacement in the axial direction of said rollers 222 will be equal to the product of the displacement of the ball 221 by the ratio of the latter to the former distance.

Rollers 222 will thus directly cause the axial displacement of the spindle 114 by means of thin plate 232 and the ring 233 between shich rollers 222 are disposed. Ring 233 is always in contact with ring 237, which is attached to spindle 114.

During the machining operation with the workhead of the invention, the axial push applied to spindle 114 and directed to the left, as seen in FIG. 8, is transmitted to lever 216, through the chain formed by rings 237 and 233, rollers 222 and plate 232. The push is in turn transmitted to the balls 220 and 221 and thus to the rear wall of the box 214.

It will be apparent that many modifications and variations can be introduced in the embodiment of the invention as described above, concerning both the shape and the arrangement of the various parts and components, without departing from the scope of the invention. However, the scope of the invention is governed only by the scope of the appended claims.

We claim:

1. In a grinding machine having a frame, a wheelhead mounted on said frame, a wheel spindle rotatably mounted on said wheelhead, and a grinding wheel having a grinding surface secured to said spindle, a workhead adjustably mounted on said frame, said workhead comprising:

a work spindle for holding a workpiece carried by said workhead, said work spindle being carried by bearings mounted on said workhead, means for mounting said work spindle for rotatable and axial movement with respect to said grinding surface whereby said workpiece can be oriented with respect to said grinding surface and brought into contact with said grinding surface, power means for rotating said work spindle, a screw element having threadably mounted thereon a nut element, said nut element and said screw element being mounted for relatively rotatable movement with respect to one another to displace said elements axially with respect to one another, said nut element having outer teeth and being rotatably mounted on said workhead and fixed against axial movement with respect to said workhead, said work spindle being coaxial with said nut element and passing through said nut element, said screw element comprising the outer surface of a first ring movable axially, a second ring attached to said work spindle and rotatably and axially movable therewith, said second ring being engageable by said first ring to cause axial movement of said work spindle, and means for rotating said screw element and said nut element with respect to one another comprising a step-by-step reversible electric motor carried by said workhead and having an output shaft means rotatable by a predetermined number of electric pulses, said output shaft means directly rotatably engaging said outer teeth of said nut element whereby rotation of said nut element by said output shaft means results in axial movement of said work spindle with respect to said workhead.

2. An apparatus as set forth in claim 1 wherein said one of said bearings is axially movable in an annular cavity, wherein said first ring is attached to and axially movable with said one bearing, and wherein said second ring is interposed between said one bearing and said first ring.

3. In a grinding machine having a frame, a wheelhead mounted on said frame, a wheel spindle rotatably mounted on said wheelhead, and a grinding wheel having a grinding surface secured to said spindle, a workhead adjustably mounted on said frame, said workhead comprising:

a work spindle for holding a workpiece carried by said workhead, means for mounting said work spindle for rotatable and axial movement with respect to said grinding surface whereby said workpiece can be oriented with respect to said grinding surface and brought into contact with said grinding surface, power means for rotating said work spindle, a screw element having threadably mounted thereon a nut element, said nut element and said screw element being mounted for relatively rotatable movement with respect to one another to displace said elements axially with respect to one another, one of said elements being fixed to said workhead and the other of said elements being connected to and movable with said work spindle, and means for rotating said screw element and said nut element with respect to one another comprising a step-by-step reversible electric motor carried by said workhead and having an output shaft means rotatable by a predetermined number of electric pulses, said screw element being connected to said output shaft means by connecting means comprising an elongated axial opening in said screw element and a pin carried by said output shaft means and engaging said axial opening to cause said screw element to be directly rotated by said output shaft means, while allowing axial displacement of said screw element.

4. An apparatus as set forth in claim 3 further comprising a pivotal lever having a first point connected to said work spindle and a second point engageable by said screw element, said first point and said second point being so related to one another as to cause said work spindle to move axially a proportionally lesser distance than said screw element is moved axially.

5. An apparatus as set forth in claim 4 wherein said lever is provided with a spindle opening through which said work spindle passes, wherein the fulcrums of said lever and said second point lie on opposite sides of the axis of said work spindle, and wherein said lever engages said work spindle at two first points spaced radially perpendicularly from a plane through said fulcrum and said second point.

6. An apparatus as set forth in claim 5 further comprising a ring axially displaceable with said work spindle and roller means interposed between said ring and said lever at said first points, said roller means engaging said ring and said lever.

7. An apparatus as set forth in claim 6 further comprising spring means urging said lever and said ring together, said spring means on the one hand engaging said workhead and on the other hand engaging a bushing axially movable with said work spindle, and further comprising a thrust bearing disposed between said bushing and said work spindle.

* * * * *